May 2, 1961 G. VÖLKERLING ET AL 2,982,849
COMBINATION FLASHLIGHT AND BATTERY RECHARGING UNIT
Filed March 17, 1958 2 Sheets-Sheet 1

Inventors:
Gerhard Völkerling, Albert Eckstein & Gerhard Schmidt
Patent Agent

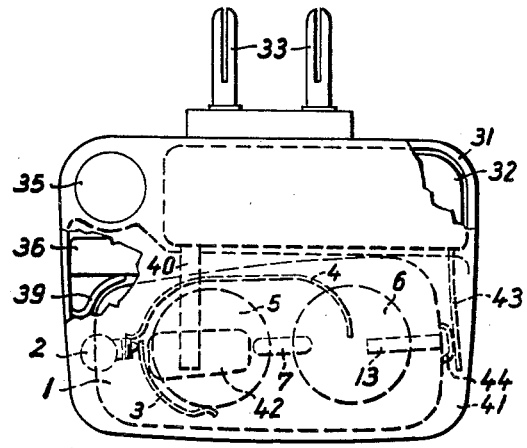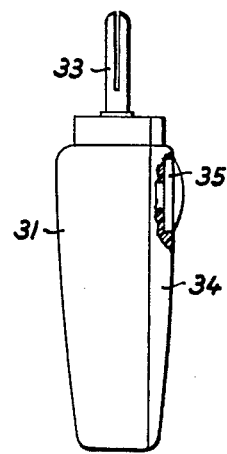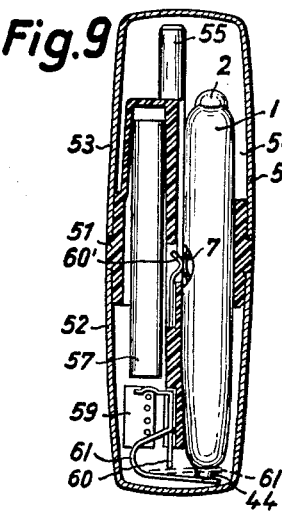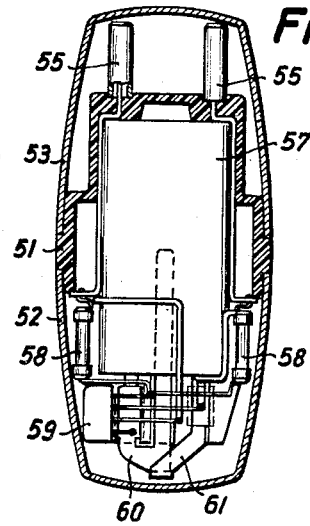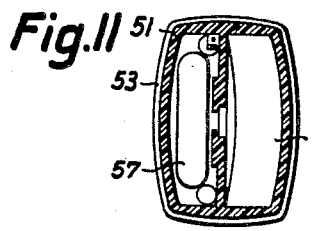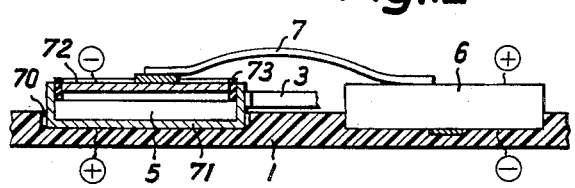

United States Patent Office 2,982,849
Patented May 2, 1961

2,982,849
COMBINATION FLASHLIGHT AND BATTERY RECHARGING UNIT

Gerhard Völkerling, Berlin-Waidmannslust, and Albert Eckstein and Gerhard Schmidt, Berlin-Frohnau, Germany, assignors to Licentia Patent-Verwaltungs-G.m.b.H., Hamburg, Germany Filed Mar. 17, 1958, Ser. No. 721,933
Claims priority, application Germany Mar. 20, 1957
11 Claims. (Cl. 240—10.65)

The present invention relates to portable electric lighting devices, and more particularly to portable flashlights provided with miniature batteries adapted to be recharged by means of specially designed charging units.

It has been known to provide portable flashlights with batteries which can be recharged by means of small charging units which the user himself can connect to the batteries in the flashlight. These charging units are either built into the flashlight or they are separate units onto which the flashlight is placed for recharging of its batteries. The known flashlights of the first mentioned type are relatively large and bulky. Therefore, if they are carried in the pocket of a garment, they tend to deform said pocket and, furthermore, they are too bulky to be placed in ladies' pocketbooks and like apparel. Another disadvantage of this type of flashlight is that the built-in recharger substantially increases the manufacturing costs of the flashlights and therefore it is uneconomical to buy such flashlights in large quantities.

The aforementioned disadvantages of flashlights provided with a built-in recharger unit are not present in rechargeable flashlights which are recharged by separate recharging units. However, the known portable flashlights of the latter mentioned type were still limited in their application due to their bulkiness, i.e. they still required more space than, for example, that which is available in a lady's powder box. Portable flashlights with such small dimensions require correspondingly small recharging units which can be taken along easily on trips due to their small size.

It is therefore an object of the present invention to provide a readily transportable flashlight with built-in gas-tight secondary battery cells, for example, of the flat type.

It is another object of the present invention to provide a portable flashlight with a flat round casing receiving two substantially flat disk-shaped gas-tight secondary battery cells which are arranged adjacent one another and which are electrically connected in series, whereby an electric light bulb forms the connection between terminals of opposite polarity of the two battery cells, while the two other terminals of these cells are to be connected by means of a manually-operable switch when the flashlight is to be lighted.

It is a further object of the invention to provide a separate recharging unit readily connectable to the aforementioned portable flashlight, said recharging unit having at least two contact fingers, one of which is engageable with the one terminal of the one battery cell, while the other contact finger is engageable with the flashlight switch connected to the terminal of opposite polarity of the other battery cell.

It is a still further object of the invention to provide abutment means on the recharging unit adapted to move the flashlight switch to open position or retain it in this position, when the flashlight is secured onto the recharging unit.

It is another object of the invention to provide the recharger for direct connection with an outlet plug box of an electric alternating current power line, whereby the alternating current is rectified by means of a rectifier bridge, across the D.C. terminals of which a high resistance of such value is connected that a charging current of proper magnitude will flow through the battery cells when the current path through the flashlight lamp is not interrupted; whereas in case of a defect in the flashlight lamp or an interruption of current in the lamp circuit, the current will flow through the high resistance, thus preventing the occurrence of dangerous voltages across the rectifier elements. The charging unit may be additionally equipped with an adjustable transformer or a voltage divider in such a manner that it can be connected to power lines of different voltages.

It is a still further object of the invention to provide the recharging unit with means whereby it can receive several portable flashlights and recharge their batteries at the same time. The recharging unit can be suitably provided with contact pins adapted to be received in electric outlet boxes of a power line.

The flashlight according to the invention is so small that it can be readily combined with or built into the housings of various articles, as, for example, ladies' powder boxes, key cases, writing utensils and the like.

Generally speaking, the new flashlight may be employed wherever it is desired to provide a light source which consumes very little space and will be continuously used for a few hours, whereafter the batteries can be recharged.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

Figs 7 and 8 are plan and side views, respectively, of another embodiment of a charging unit pursuant to the present invention.

Figs. 9, 10 and 11 are two longitudinal sections and one cross-section, respectively, through another modified charging unit according to the invention, and Figure 12 is a sectional view showing in detail the battery cells and the slidable contact switch in accordance with the invention.

Figure 1:
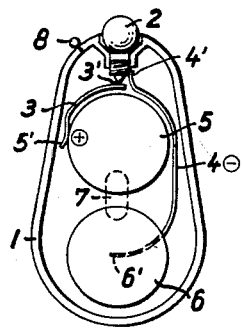
Fig. 1 shows a cross-section through a portable flashlight according to the present invention.
Figure 3:
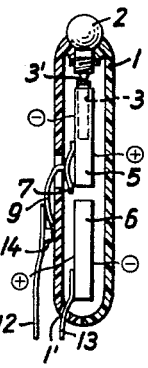
Fig. 3 is a longitudinal section through the flashlight according to Fig. 1, showing the contact fingers of the charging unit when placed thereon for recharging the battery of the flashlight.

The portable flashlight according to Figs. 1 and 3 comprises an oblong and flat housing 1 made, for example, of insulating material such as plastic, and having an opening at one end adapted to receive an incandescent lamp or bulb 2. Contact wires or springs 3 and 4, respectively, engage the base 3' and socket 4' of the lamp 2 which extends into the housing 1. The free ends of these springs 3 and 4 resiliently engage flat disk-shaped, miniature battery cells 5 and 6 which are disposed adjacent one another within the housing 1, i.e. the end 5' of spring 3 engages the outer one terminal of the battery cell 5, while the end of spring 4 engages the other terminal of battery cell 6, said latter terminal being of opposite polarity than that of the terminal of cell 5 engaged by the spring 3. A bifurcated, slidable contact switch 7 accessible from the outside of the housing 1 by means of a button contact 9 passes through a cutout or slot provided in the center of the housing 1, said button being secured at its inner face to said slidable switch so that movement of the button contact 9 in one direction serves to interconnect the battery cells 5 and 6 through the intermediary of switch 7 and thereby, close the circuit through the lamp 2. This slidable switch 7 can be displaced relative to the outer surface of the respective battery cells 5 and 6, so that when the switch is in the position shown in Fig. 3 only the battery cell 5 is engaged and the lamp circuit is interrupted, whereas when the slide 7 is in the position indicated in dotted lines in Fig. 1, the two battery cells are interconnected and thereby the lamp circuit is closed. Additionally, an eyelet 8 may be attached to the outer wall of housing 1, said eyelet being adapted to receive a band or chain, by means of which the flashlight can be worn or secured to other articles to avoid its becoming lost or misplaced.

Figure 2:
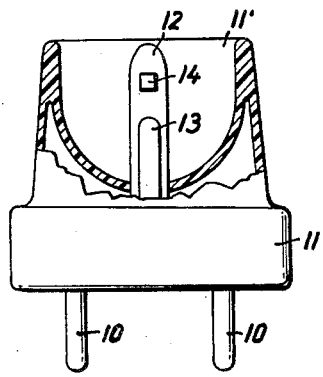
Fig. 2 is a side view partially in section, of a recharging unit to be used for recharging the battery of the flashlight according to Fig. 1.

The recharging unit shown in Fig. 2 comprises a socket member or housing 11 wherein the electric components constituting the recharger are located, said housing having prongs or pins 10 adapted to be received in an outlet plug box of an A.C. power line for feeding the recharging unit. The upper portion of the casing or housing 11 of the recharging unit has a recess or cavity 11' having its inner walls substantially contoured to the shape of the lower peripheral portion of the flashlight housing 1 shown in Fig. 1, so as to be adapted to receive the flashlight when the batteries of the latter are to be charged. A pair of contact fingers or springs 12 and 13 extend from the lower part of the recharger housing 11 into the recess 11', these fingers or springs being adapted and arranged to connect to the respective battery cells inside of the flashlight housing 1 when the latter is placed within the recess 11'.

The engaging position of the fingers or springs 12 and 13 is shown schematically in Fig. 3. The shorter finger or spring 13 is passed through a slot or opening 1' provided in the lower portion of the housing 1 and engages at its free end the one terminal of the battery cell 6 which is inside this housing, while the longer contact finger or spring 12 with its free end engages the button 9 which is located exteriorly of the housing 1. Since this button 9 is conductive and is secured to the bifurcated switch 7 which is inside the housing 1 and engages in one position the one terminal of the battery cell 5, an electric connection to these battery cells 5 and 6, via the respective springs 12 and 13, is established. An abutment or projection 14 provided on the spring 12 engages the lower edge of the button 9 when the housing 1 is placed into the recess 11' of the recharging unit and thereby automatically moves the slide switch 7 to the open position shown in Fig. 3 and retains the latter in this position so that accidental closing of the switch is positively prevented.

Figure 4:
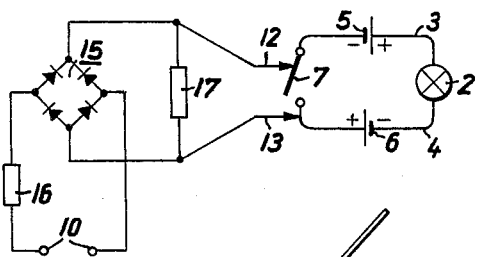
Fig. 4 is an electric circuit diagram of the flashlight and the recharging unit.

In the circuit diagram of Fig. 4 the elements illustrated in Figs. 1, 2 and 3 are denoted by similar reference numerals. The recharging unit is connected through the intermediary of prongs 10 to a power line supplying A.C. current. The prongs or pins 10 are additionally connected to a rectifier bridge 15 including four rectifier elements. A voltage reducing high resistance 16 is inserted in the A.C. circuit between one of the pins 10 and the rectifier bridge 15. The D.C. terminals of the rectifier bridge 15 are connected to the contact fingers or springs 12 and 13. A protective resistance 17 is connected across the contact springs or fingers 12 and 13, said resistance having such value that a charging current of proper magnitude flows through the battery cells when the latter are connected to the recharging unit and the current path through the lamp 2 is uninterrupted, while, in case of a burnt-out lamp or disconnection in the lamp circuit, current will flow through the protective resistance 17, thus preventing the presence of dangerous voltages in the rectifier bridge 15.

Figure 5:
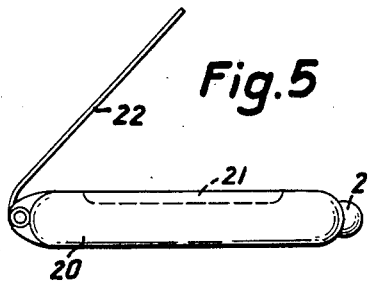
Fig. 5 is a side view schematically showing the application of the new flashlight to a lady's cosmetic utensil.

In the embodiment disclosed in Fig. 5, a flashlight according to the present invention is combined with a lady's powder box or compact. A casing or housing 20 is provided at its upper surface with a shallow pocket or recess 21 adapted to receive the cosmetic constituents, the upper or open side of this recess being adapted to be covered by a mirrored top or cover 22 which is articulated by means of a hinged connection to one edge of the housing 20. The battery cells (not shown) of the flashlight are located within the housing 20 and beneath the shallow recess 21 and are connected as shown in Figs. 1 and 3 to the lamp 2, of which only the part of the bulb protruding from the housing 20 is shown in Fig. 5.

Figure 6:
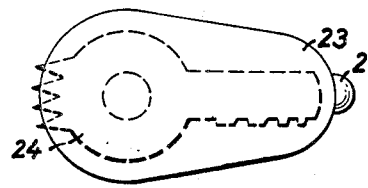
Fig. 6 shows a plan view schematically illustrating the application of the new flashlight to a key case.

In Fig. 6 there is disclosed a key case provided with a flashlight attachment pursuant to the present invention wherein a housing 23 is adapted to receive keys 24 shown in phantom. The housing 23 also contains the flashlight battery cells (not shown) and the electric lamp 2, of which only the part of the bulb protruding from the housing 23 is shown. For convenience of description the details of the flashlight interior shown in Fig. 1 have been omitted in Figs. 5–11.

The modified recharging unit of Figs. 7 and 8 is designed to receive the flashlight to be recharged in such a manner that the latter will be completely enclosed in this recharging unit thereby forming a composite flashlight and recharger assembly. The latter comprises a casing or housing 31, preferably of plastic, having an open side covered by a pivotable lid 34 adapted to be angularly displaced about a pivot 35 to expose the interior of housing 31. Pins or prongs 33 provided on one side of the housing 1 are adapted to be inserted into an outlet plug box of a power line for supplying the recharging unit with alternating current. A chamber 32 formed in the housing 31 adjacent the pins 33 contains the electrical components of the recharging unit, for example, those shown in the circuit diagram of Fig. 4. A partition 36 separates the chamber 32 from a compartment 41 adapted to receive a flashlight 38 similar to the type disclosed in Fig. 1 when the batteries of the latter are to be recharged. A resilient support 39 located within the compartment 41 retains the flashlight 38 in the proper position, as best seen in Fig. 7. A contact finger or spring 40 extending from the chamber 32 into the compartment 41 serves as a conductor for connecting one of the D.C. terminals of the recharging unit to a conductive switch or button contact 42 carried on the outside of the flashlight housing 38; this switch or button contact 42 corresponds to the button contact 9 shown in Fig. 3. The other D.C. terminal of the recharging unit inside the chamber 32 is connected to a contact finger or spring 43 also extending from the chamber 32 into the compartment 41 and being adapted to resiliently engage a conductive lug or terminal contact 44 on one end of the flashlight 38, said lug 44 connecting inside the flashlight housing to one terminal of one of the battery cells, for example cell 6 of the flashlight shown in Fig. 3. The lid 34 of the housing 31 is opened by displacing it about the pivot 35 to permit insertion of the flashlight 38 into the housing, and is closed during the recharging operation, thereby preventing the flashlight from dropping out of the housing of the charging unit and ensuring proper engagement of the flashlight with the contact fingers 40 and 43.

The embodiment of Figs. 9, 10 and 11 relate to a charging unit for flashlights, said unit being in the shape of an oblong substantially rectilinear casing provided with rounded corners. The charging unit comprises an intermediate member or frame 51 supporting the circuit components for the recharging unit. Hood-shaped cover members 52 and 53 are slid or placed from opposite sides over the frame 51 in such a way that only a narrow center portion of the frame 51 is visible from the outside when the charging unit is closed by the respective cover members 52 and 53. The cover piece 52 is preferably fixed to the frame 51, because normally it does not need to be detached therefrom. The cover piece 53 is readily removable from the frame 51 to facilitate insertion of the flashlight for recharging thereof, whereby the latter occupies the chamber 54 (see Figs. 9 and 11). The end of frame 51 has contact pins 55 adapted to be inserted in an outlet plug box of a power line for A.C. current. The mounting base for these pins on the frame 51 is designed in such a way that contact pins of different construction or standards, such as German, English, American, can be utilized. A condenser 57 connected to the alternating circuit of rectifier bridge (not shown) is surrounded and supported by the frame 51, said rectifier bridge being housed in a casing 59 secured to the lower portion of the frame 51 within the housing hood or cover 52. The D.C. terminals of the rectifier bridge in the casing 59 are connected to contact springs 60 and 61 which are also provided in the lower portion of cover member 52 and are mounted on the frame 51. When no flashlight is inserted in the recharging unit, the contact springs 60 and 61 are biased to engage one another, as indicated in dotted lines in Fig. 9, whereby the D.C. terminals of the rectifier bridge are short-circuited. If the flashlight is inserted in the recharging unit a contact lug or terminal carried at one end of said flashlight, similar to lug 44 shown in Fig. 7, will displace the contact spring 61 so as to move it downwards (see Fig. 9), whereby the contact spring 61 becomes separated from contact 60, so that a D.C. current can flow to the battery cells located inside the flashlight by means of said lug or terminal and via resilient end portion 60′ of the contact spring 60, said end portion 60′ being adapted to engage the contact button of the switch for the flashlight which is to be recharged (see Figs. 3 and 7).

The condenser 57 may be shunted by resistances 58 also mounted on the frame 51 within the lower part of the housing hood 52 so that the condenser can be properly discharged. Instead of such additional resistances 58 the condenser may be made from a dielectric having at least partially a low conductivity so that this dielectric represents a high resistance, by means of which the condenser will be discharged.

Whilst the cells 5 and 6 are shown in the various figures just in their outlines, Fig. 12 gives a more detailed impression of them. The casing 1 has a recess 70 into which fits the cell 5. The body 71 has positive potential, the cover 72 on the other hand negative potential. They are separated by a ring 73 of insulating material. The contact spring 7 connects the negative pole of cell 5 to the positive pole of cell 6. Spring 3 shown in part only establishes the contact from the positive pole of cell 5 to the lamp not shown in this figure.

The wiring scheme of the lamp type as per Figs. 9 to 11 is similar to the one shown in Fig. 4, the difference being that, parallel to the resistor 16 a condenser (capacitor) 57 is connected.

We claim:

1. A combination miniature portable flashlight and battery recharging unit, comprising a flashlight housing, a pair of miniature disc-shaped battery elements disposed adjacent each other in said flashlight housing, a bulb member carried by said housing, means operatively connecting each terminal of said bulb member to a terminal of opposed polarity of each of said respective battery elements, a slidable contact switch supported by said housing, a button connected to said contact switch for displacing the latter into a first position for closing and completing an electric circuit for lighting said bulb, said contact switch in a second position contacting only one terminal of one of said battery elements, said recharging unit being provided with a casing adapted to be detachably secured to said flashlight housing, a current rectifying-bridge located in said casing for converting alternating current received from a power supply line to direct current for charging of said battery elements, a pair of contact fingers communicating with said rectifying-bridge for delivering said direct current to said battery elements during recharging thereof, one of said contact fingers engaging said button for displacing and retaining the latter including said contact switch in said second position whereby said switch is in open position, the other contact finger engaging the other of said battery elements thereby electrically connecting said rectifying-bridge to said battery elements for recharging the latter.

2. A device as set forth in claim 1, wherein said casing is provided with a recess having its inner walls contoured to the shape of a portion of said flashlight housing for frictionally engaging said portion of said flashlight housing during recharging of said battery elements.

3. A device as set forth in claim 1, wherein said button is conductive and is movable relative to said flashlight housing.

4. A device as set forth in claim 1, wherein said flashlight housing is provided with an opening for receiving said other contact finger engaging the other of said battery elements.

5. A device as set forth in claim 1, wherein said casing is provided with a pivotable lid obturating the interior of said casing, said flashlight being disposed in said casing during recharging of said battery elements.

6. A device as set forth in claim 1, wherein said casing is provided with a frame member for supporting said flashlight during recharging thereof, said casing further including a pair of cover members engageable with said frame member.

7. A device as set forth in claim 6, wherein said frame member supports a condenser which is in circuit with said rectifying-bridge.

8. An illuminating device comprising a flashlight and a separate recharging unit, said flashlight comprising a flat flashlight housing, a pair of flat hermetically sealed battery cells tandemly arranged adjacent one another within said flashlight housing so that the respective surfaces of said battery cells facing in the same direction have different polarity, a contact switch carried by said flashlight housing arranged on one side of said battery cells and slidable into a first position to connect the surface of one of said cells to the surface of opposite polarity of the other cell, said contact switch being slidable into a second position to interrupt the connection between said battery cells and contacting only said one cell, said flashlight housing being provided with an opening, a lamp disposed in said opening, conductor means for connecting the lamp terminals to the remaining terminal surfaces of said battery cells, a pair of contact elements arranged on the outer surface of said flashlight housing, one of said contact elements being connected to said contact switch, the other contact element being connected to said other battery cell, said separate recharging unit being provided with a compartment for receiving said flashlight housing, a pair of charging contacts carried by said recharging unit and engageable with said one contact element on said flashlight housing when the latter is inserted into said compartment, an abutment carried by one of said charging contacts engageable with said one contact element to force said contact switch into its second position when the flashlight housing is inserted into the recharging unit.

9. An illuminating device comprising a flashlight and separate recharging unit, said flashlight comprising a flashlight housing, a pair of miniature flat hermetically sealed battery cells situated adjacent one another in said flashlight housing, said housing being provided with an opening, a lamp disposed in said opening, conductors connecting one terminal of said lamp to one terminal of one of said battery cells and the other terminal of said lamp to the terminal of opposite polarity of the other battery cell, respectively, a switch in said housing engaging in one position the other terminal of one of said battery cells and being displaceable into another position so as to connect said latter battery cell terminal to a terminal of opposite polarity of said other battery cell; said recharging unit comprising means forming a receiving chamber for receiving said flashlight, contact fingers being electrically connected with terminals of opposed polarity of said respective battery cells when said flashlight is received in said receiving chamber for recharging of said batteries, and abutment means arranged in said receiving chamber retaining said switch in said one position when said flashlight is received in said receiving chamber.

10. A device as set forth in claim 9, wherein said abutment means for retaining said switch in said one position is carried by one of said contact fingers.

11. A device according to claim 9, wherein the recharging unit further comprises a rectifier bridge having an input connectible to an A.C. current source and an output for feeding D.C. current to said battery cells to be charged, a high resistance element across said D.C. output, said resistance being of such value that when there is an uninterrupted circuit connection through the lamp a charging current of sufficient magnitude flows through the battery cells, whereas when there is an interrupted current path through the lamp, current will flow through said resistance so that the occurrence of dangerous voltages across said rectifier bridge is prevented.

References Cited in the file of this patent

UNITED STATES PATENTS

| | | |
|---|---|---|
| 2,480,223 | Costanzo | Aug. 30, 1949 |
| 2,628,339 | Werner | Feb. 10, 1953 |
| 2,642,520 | Coolidge et al. | June 16, 1953 |
| 2,876,410 | Fry | Mar. 3, 1959 |
| 2,880,306 | Witte | Mar. 31, 1959 |

FOREIGN PATENTS

| | | |
|---|---|---|
| 732,364 | Germany | Mar. 1, 1943 |
| 732,431 | Germany | Mar. 4, 1943 |